(12) United States Patent
Ahari et al.

(10) Patent No.: US 8,190,601 B2
(45) Date of Patent: May 29, 2012

(54) IDENTIFYING TASK GROUPS FOR ORGANIZING SEARCH RESULTS

(75) Inventors: Sanaz Ahari, Kirkland, WA (US); Xiaoxin Yin, Bothell, WA (US); Farid Hosseini, Redmond, WA (US); Sarthak Shah, Kirkland, WA (US); Adam Troy, Redmond, WA (US); Daniel C. Fain, Redmond, WA (US); Brian MacDonald, Bellevue, WA (US); Nikhil Dandekar, Seattle, WA (US); Michael Cameron, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 356 days.

(21) Appl. No.: 12/471,116

(22) Filed: May 22, 2009

(65) Prior Publication Data

US 2010/0299343 A1    Nov. 25, 2010

(51) Int. Cl.
*G06F 7/00* (2006.01)
*G06F 17/30* (2006.01)
(52) U.S. Cl. .......................... 707/722; 707/723; 707/731
(58) Field of Classification Search ......................... None
See application file for complete search history.

(56) References Cited

U.S. PATENT DOCUMENTS

| | | | |
|---|---|---|---|
| 6,675,159 B1 | 1/2004 | Lin | |
| 2002/0143860 A1* | 10/2002 | Catan | 709/203 |
| 2006/0010126 A1* | 1/2006 | Anick et al. | 707/4 |
| 2006/0074902 A1 | 4/2006 | Anderson et al. | |
| 2006/0085180 A1* | 4/2006 | Menezes et al. | 704/2 |
| 2007/0226198 A1* | 9/2007 | Kapur | 707/3 |
| 2007/0294240 A1 | 12/2007 | Steele | |
| 2008/0082518 A1 | 4/2008 | Loftesness | |
| 2008/0104037 A1 | 5/2008 | Bierner | |
| 2008/0208848 A1* | 8/2008 | Choi | 707/5 |
| 2009/0306969 A1* | 12/2009 | Goud et al. | 704/10 |

OTHER PUBLICATIONS

Web Search Intent Induction via Automatic Query Reformulation http://www.aclweb.org/anthology-new/N/N04/N04-4013.pdf.
Intentional Query Suggestion: Making User Goals More Explicit During Search http://kmi.tugraz.at/staff/markus/documents/2009_WSCD09_Intentional-Query-Suggestion.pdf.
Determining the Informational, Navigational, and Transactional Intent of Web Queries http://ist.psu.edu/faculty_pages/jjansen/academic/pubs/jansen_user_intent.pdf.
Taxonomy-Based Adaptive Web Search Method http://www.kde.cs.tsukuba.ac.jp/papers/2002/ITCC02.pdf.
A Scalable Topic-Based Open Source Search Engine http://citeseerx.ist.psu.edu/viewdoc/summary?doi=10.1.1.61.115.

* cited by examiner

*Primary Examiner* — Jay Morrison
(74) *Attorney, Agent, or Firm* — Shook, Hardy & Bacon LLP

(57) ABSTRACT

Computer-readable media and computerized methods for automatically organizing search results according to task groups are provided. The methods involve aggregating a gallery of entities (e.g., search queries that share a common categorization) into a query class and assigning a dictionary (e.g., list of terms that are drawn from various sources) to the query class. The task groups are identified from the list of terms within the dictionary. The process of identification includes analyzing patterns of user search behavior to select terms from the list of terms, which reflect popular user search intents, and ranking the selected terms based on predetermined parameters to produce an ordering. Based on the ordering, a set of the selected terms that are highest ranked are declared the task groups. The task groups are employed to arrange the search results on a UI display and to provide a consistent and intuitive format for refining a search.

12 Claims, 8 Drawing Sheets

IDENTIFYING TASK GROUPS FOR ORGANIZING SEARCH RESULTS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Various techniques exist that enable Internet-based search engines to receive and process queries from users and to provide search results based thereon. Because these search engines are typically coupled with data stores, queries, search results, and other search data may be conveniently stored for subsequent access. Analysis of this available search data may be interesting to identify trends within patterns of Internet use and to arrange search results based on those trends. However, existing methods for retrieving the search data are ineffective for detecting trends or implementing an intuitive arrangement of search results.

Generally, the existing methods and present techniques are configured to offer users a standard search experience that involves locating and presenting in a single list a particular number of search results that are semantically-related to the query. However, these existing methods are inappropriate for properly managing the search results on a user interface (UI) display and for providing a user with an organized experience. In particular, present techniques do not offer sufficient evaluation of the search data to group information based on top user intents and tasks associated with a query. Thus, these present techniques are inadequate for sorting search results on a UI display based on the user's intents and tasks. Accordingly, employing a procedure to organize search results that are responsive to a query, where the arrangement of the search results is based on a user's intents and tasks deduced from the query, would enhance a user's experience searching the particular subject.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention generally relate to computer-readable media and computerized methods for organizing search results based on a list of predefined task groups that attempt to capture a collection of users' top common intents when issuing a particular query. In one instance, the list of predefined task groups is identified by analyzing patterns of user search behavior to select terms that reflect popular user search intents with respect to a query or class of queries. In variations of this method for identifying task groups, the selected terms may be ranked based on predetermined parameters (e.g., terms that correspond to the greatest number of entities stored in the data store) to produce an ordering, and declaring a set of the selected terms that are the highest ranked, based on the ordering, the task groups.

By way of example only, with reference to a search query of "Audi," the top common intents of users who submit a query of "Audi" may be to locate search results pertaining to "sales," "parts," "types," "dealers," "reviews," "prices," and "accessories." These top common intents may be aggregated from patterns of user search behavior that are associated with previous user-initiated searches for "Audi" or for other car brands. In other words, common intents of a user may be identified with respect to a particular query (e.g., Audi), or may be identified with respect to a class of queries (e.g., cars), where each specific query in a class (e.g., Toyota, Mazda, BMW, and the like) correspond to the same common user intents.

One or more terms that describe these common user intents are attached to the user intents and designated as task groups. In addition, search results that are determined to be relevant to the task groups are associated therewith. As such, when a query is issued (e.g., Audi), the search results are selected and arranged based on the task groups (e.g., sales, parts, types, dealers, and the like). Further, this arrangement of the search results is rendered on a user interface (UI) display, thereby providing a user with an organized experience. Advantageously, this arrangement of search results in accordance with task groups is based on a prediction of the user's intents when submitting the query; thus, the rendered arrangement of the search results is intuitive to the user and promotes efficient narrowing of a search and enhanced identification of a relevant search result.

BRIEF DESCRIPTION OF THE DRAWINGS

The present invention is described in detail below with reference to the attached drawing figures, wherein.

DETAILED DESCRIPTION

Figure 1:
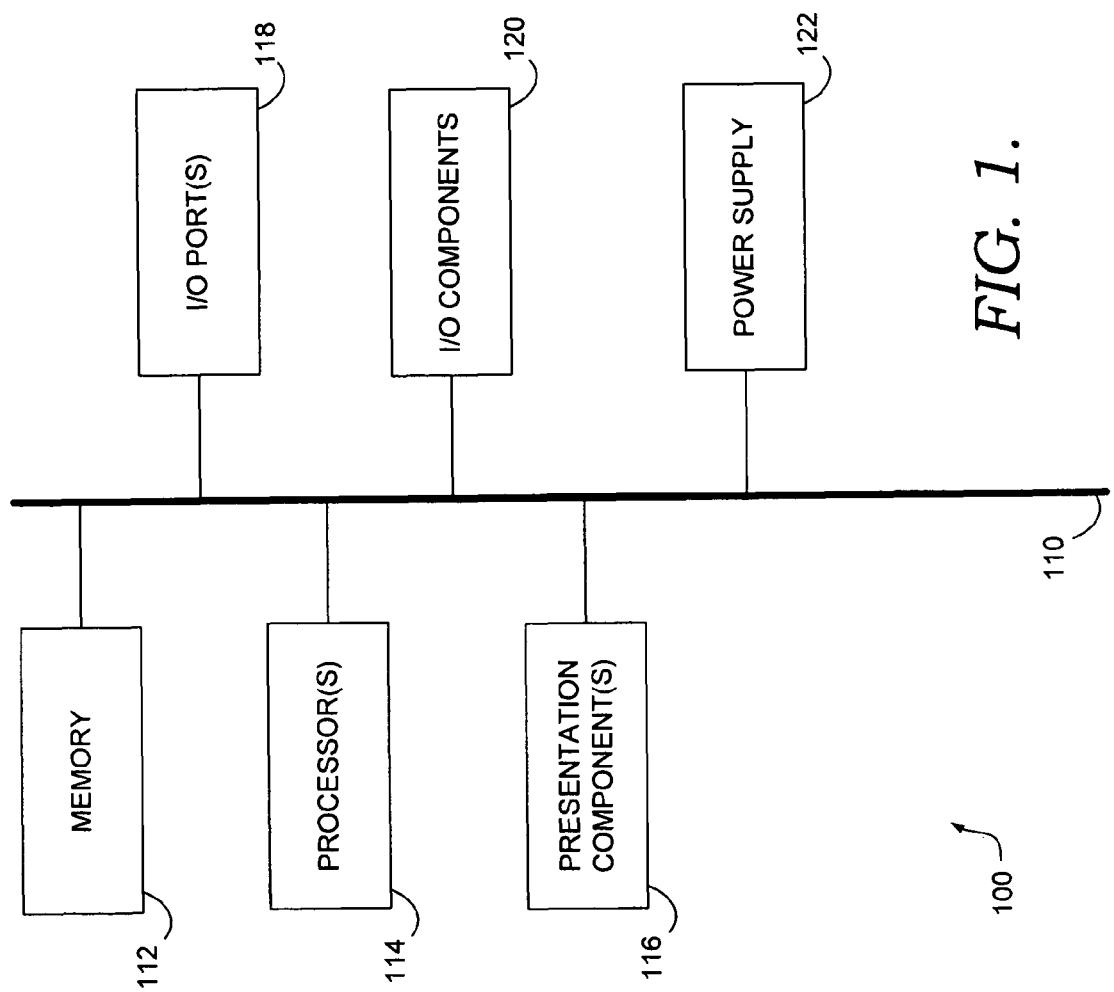
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies.

Accordingly, in one embodiment, the present invention relates to computer-executable instructions, embodied on one or more computer-readable media, that perform a method for automatically organizing search results according to task groups. Initially, the method includes, in embodiments, aggregating a gallery of entities into a query class. Typically, the gallery of entities corresponds to queries that share a common categorization. At least one dictionary is assigned to the query class, where the dictionary includes a list of terms that are drawn from one or more sources (e.g., data store communicatively coupled to a search engine). The method further involves identifying the task groups from the list of terms within the dictionary by utilizing a process. In an exemplary embodiment, the process for identifying the task groups involves, at least, the steps of analyzing patterns of user search behavior to select one or more terms from the list of terms that reflect popular user search intents, ranking the terms based on predetermined parameters to produce an ordering, and based on the ordering, declaring a set of the terms that are highest ranked within the ordering the task groups. These task groups may be persisted, at least temporarily, by storing them on the computer-readable media in association with the query class.

In another embodiment, aspects of the present invention involve a computerized method, implemented at a processing unit, for manipulating a composition of a list of terms associated with a query class. Initially, the method involves a step of selecting a gallery of entities that are compiled to form the query class. Generally, each entity in the gallery of entities corresponds to a query that shares a common categorization with other queries represented by other entities in the gallery of entities. A list of terms may be extracted from at least one data store, where each term in the list of terms is associated with a search refinement path of the query. In this instance, the query includes entities that reside in the selected gallery of entities.

At some point, a structured searchable database is scanned to identify equivalences between terms within the list of terms and/or relevant terms that share a common categorization with the query class. In one instance, scanning the structured searchable database to identify equivalences between terms within the list of terms includes the procedures of mining the structured searchable database for redirects that indicate synonymous terms, ascertaining that the synonymous terms appear in the list of terms, and condensing the composition of the list of terms by removing one or more of the synonymous terms. In another instance, scanning the structured searchable database to identify relevant terms that share a common categorization with the query class includes the procedures of mining the structured searchable database for topics that categorize the gallery of entities assembled to form the query class, associating a score with the topics based upon a number of entities in the gallery of entities that are related to the topic, and comparing the score associated with each of the topics against each other to distill a set of highest scoring topics from the topics. Based on the highest scoring topics, the composition of the list of terms may be expanded by incorporating terms categorized by the highest scoring topics into the list of terms.

Accordingly, based on a scan of the structured searchable database, the composition of the list of terms is condensed or expanded by applying the equivalences or the relevant terms, respectively, to update the list of terms. Once the list of terms is updated, the original list of terms is replaced with the updated list of terms. Further, the updated list of terms, in association with the query class, is written to a storage location on computer-readable media accessible by the processing unit for subsequent access.

In yet another embodiment, the present invention encompasses one or more computer-readable media that has computer-executable instructions embodied thereon that, when executed, perform a method for utilizing task groups to automatically organize search results on a user-interface (UI) display. Generally, the method includes providing a plurality of dictionaries. As discussed above, each of the plurality of dictionaries includes a list of terms, where each term in the list of terms, at some point, helped refine a search for an entity within a gallery of entities. Typically, each entity in the gallery of entities is associated with the other entities in the gallery as they belong to the same category. One or more terms from the list of terms, which reflect popular user search intents of users over a predefined timeframe, are identified. These one or more identified terms are promoted to task groups.

Once the task groups are established, the search results that are responsive to a query are selected and arranged based on the task groups. In particular, a user-issued query may be received that is comprised of search terms that map to an entity associated with one or more of the plurality of dictionaries. Upon receiving the user-issued query, a dictionary from the plurality of dictionaries is selected and the task groups associated with the selected dictionary are recognized. In one instance, selecting a dictionary involves the steps of reviewing the list of terms comprising each of the plurality of dictionaries, and, upon review, targeting the dictionary that includes the list of terms that are most frequently employed to narrow a search with the user-issued query.

Search results that are responsive to the query are gathered in conjunction with each of the task groups, respectively. Eventually, a presentation device is instructed to render the search results on the UI display. In one embodiments, the search results are displayed proximate to each of the task groups with which each of the search results corresponds, respectively. In one instance, the process of displaying involves the following steps: locating a portion of the search results, which are responsive to a search using the first of the task groups, below a heading that describes the first task group on the UI display; and locating a portion of the search results, which are responsive to a search using the second of the task groups, below a heading that describes the second task group on the UI display. In another instance, the process of displaying involves presenting a panel on the UI display that adjoins the organized search results. Typically, the panel publishes a table of contents that enumerates the first and the second task groups.

Having briefly described an overview of embodiments of the present invention and some of the features therein, an exemplary operating environment suitable for implementing the present invention is described below.

Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks or implements particular abstract data types. Embodiments of the present invention may be practiced in a variety of system configurations, including handheld devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear and, metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVDs) or other optical or holographic media; magnetic cassettes, magnetic tape, magnetic disk storage or other magnetic storage devices; or any other medium that can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc. I/O ports 118 allow computing device 100 to be logically coupled to other devices including I/O components 120, some of which may be built in. Illustrative components include a microphone, joystick, game pad, satellite dish, scanner, printer, wireless device, etc.

In some embodiments, the computing device 100 of FIG. 1 is configured to implement various aspects of the present invention. In one instance, these aspects relate to providing a user with a new organized search experience. Generally, providing an organized search experience involves organizing search results, in response to a query, such that when the user submits an initially high level of the query (e.g., Audi), the process breaks down the search results to organized components that fit under a predefined number of task groups (e.g., Sales, Parts, Types, Dealers, Reviews, Price, Accessories, and the like).

As used herein, the phrase "task groups" is not meant to be limiting, but broadly describes top common intents of individual users, or a collection of users, that have submitted a particular query. The top common intents and/or tasks of users pertain to the most popular goals the users want to achieve when submitting a high level of query. By way of example only, popular goals that are associated with the high-level query of "Seattle" may be to determine the "current weather in Seattle" or to find "restaurants in Seattle." As such, these popular goals or intents/tasks are established as the task groups for the query "Seattle." In similar embodiments of the present invention, discussed more fully below, the popular goals maintained by users, upon entering a particular query, are stored as task groups that are associated with (a) the particular query, (b) a collection of similarly themed queries (e.g., query class), and/or (c) each of the queries comprising the query class.

In another embodiment, task groups refer to general categories within a query class that divide into logical baskets the search results that are associated with queries of the query class. By way of example, the general categories of a search for "Jennifer Lopez" may include "albums," "images," and "awards," but also may include websites that are frequently accessed to discover a biography of Jennifer Lopez. These websites may relate to "instant answers" that are artificially created by the search engine 275, or other entity, to help a user quickly and efficiently refine a high-level query. As such, the general categories facilitate organizing the instant answers and search results to provide a user with a comprehensive selection of possible refinement paths to utilize when narrowing the high-level query. Thus, arranging the search results by categories, instead of simply arranging the search results by relevance to a query, help the user target a group of search results that correspond to his/her true intent behind entering the high-level query.

The phrase "query class," as utilized herein, is not meant to be limiting, but may expansively encompass any set, list, manifest, aggregation, and/or index of terms or phrases that collectively share at least one common characteristic. In an exemplary embodiment, the query class represents a collection of previously issued queries and other complimentary terms that each relate to a particular theme. By way of example, with reference to the common theme of "cars," the query class represents such previously issued queries as "Audi," "Nissan," "Porsche," and "Mercedes Benz." These previously issued queries, terms that compliment the queries, instant answers, and any other items that relate to a particular theme are referred to herein as "entities." Accordingly, the collection of entities that share the common characteristic of a particular query class are referred to herein as a "gallery of entities." In a particular instance, the gallery of entities broadly refers to a set of queries in a similar class that share the same intent or task maintained by a user who submits a query within the set of queries.

Accordingly, as discussed above, each of the task groups established for a query class may be used to categorize the search results for each entity within the entity gallery. As such, applying the task groups consistently across the entities in a gallery promotes a categorized search experience that delivers a consistent organization of search results within a particular query class. By way of example, if the theme of the query class is "cars," then the entities in the entity gallery, in some fashion, relate to aspects or models of cars. With further reference to this example, if the user submits a query that corresponds to any entity in the gallery of entities associated with the "cars" query class, the query will produce a consistent list of task groups (e.g., Sales, Parts, Types, Dealers, Reviews, Price, Accessories, and the like) regardless of the entity matching the query. That is, for every query that includes as a component an aspect or model of car, the same consistent organized experience is delivered via the constant utilization of task groups for that query class. In other embodiments, the list of task groups is varied between different entities by changing the ordering or the composition of the list of task groups.

Further lists of terms may be associated with each query class and each gallery of entities. This list of terms, or "dictionary," encompasses terms, phrases, and alphanumeric strings that are derived from past searches, or, at least, are modifiers of past searches. In one instance, the dictionary includes terms and phrases that are associated with search results that are responsive to entities within the gallery of entities (e.g., queries that share a common characteristic) corresponding to a query class. In one embodiment, the list of terms that comprise the contents of a dictionary are generated from structured data feeds compiled by a search engine. In another embodiment, the list of terms is extracted from distributed data sources and imported to a search engine.

Although two different configurations of aggregating a list of terms have been described, it should be understood and appreciated by those of ordinary skill in the art that other types of suitable procedures for producing and for updating a list of terms may be used, and that embodiments of the present invention are not limited to those exemplary mechanisms for aggregating a list of terms described herein. For instance, an administrator of a search engine may deliberately manufacture the list of terms for a certain query class with minimal reliance on another source of user search behavior.

Figure 2:
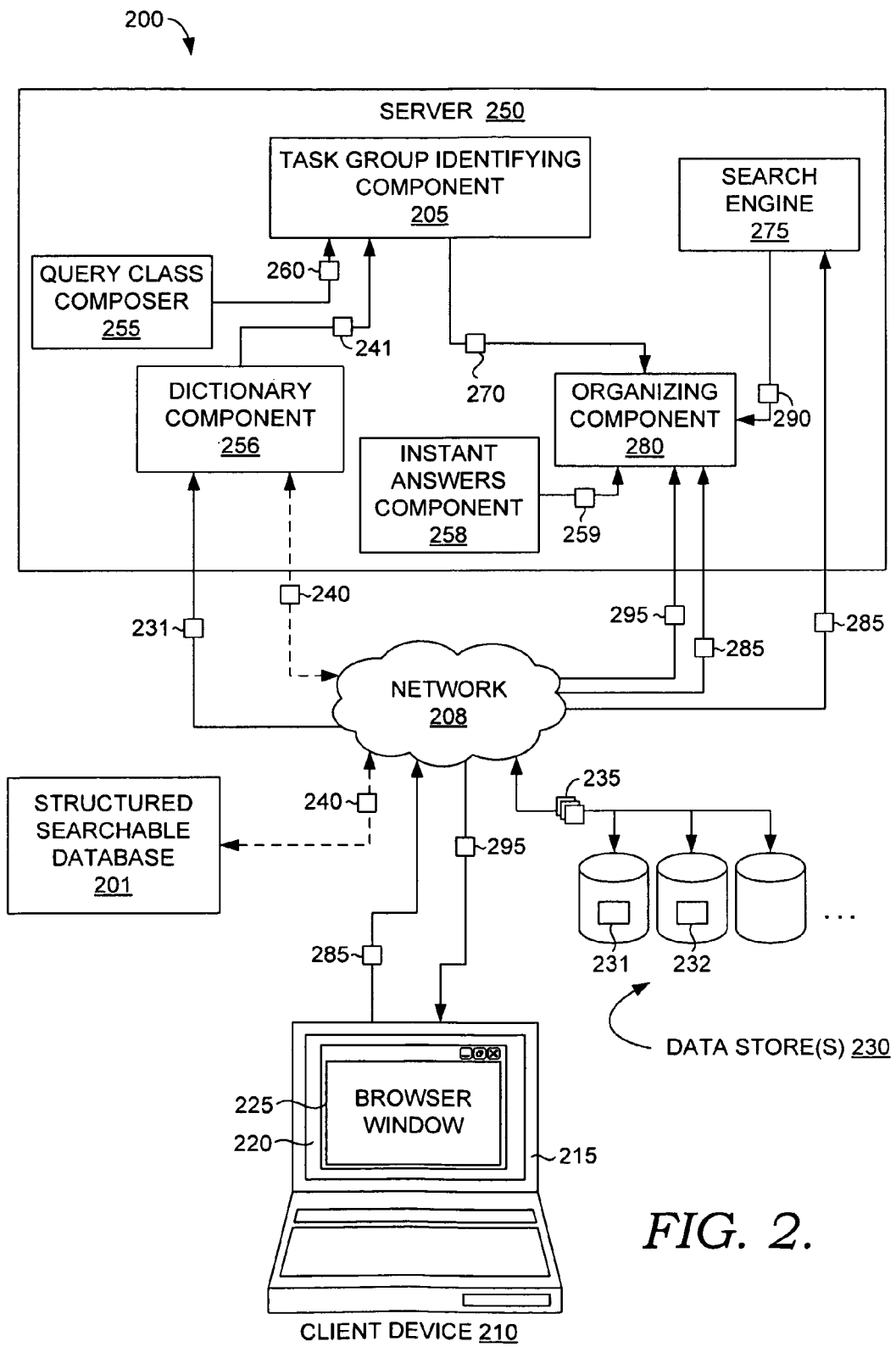
FIG. 2 is a block diagram illustrating a distributed computing environment, suitable for use in implementing embodiments of the present invention, that is configured to ascertain task groups from patterns of search behavior and to apply the task groups when rendering search results in a user interface (UI) display.

A categorization process for automatically generating a set of task groups for a query class and for organizing search results on a UI display based on the task groups will now be discussed with reference to FIG. 2. In particular, FIG. 2 depicts a block diagram that illustrates an exemplary system architecture 200 of a distributed computing environment, suitable for use in implementing embodiments of the present invention. Generally, implementing embodiments of the present invention relate to ascertaining task groups from patterns of search behavior and to applying the task groups when presenting search results to a user (e.g., rendering search results in a UI display). It should be understood and appreciated that the exemplary system architecture 200 shown in FIG. 2 is merely an example of one suitable computing environment and is not intended to suggest any limitation as to the scope of use or functionality of the present invention. Neither should the exemplary system architecture 200 be interpreted as having any dependency or requirement related to any single component or combination of components illustrated therein.

Initially, the exemplary system architecture 200 includes a client device 210, data stores 230, a structured searchable database 201, a server 250, and a network 208 that interconnects each of these items. Each of the client device 210, the data stores 230, the structured searchable database 201, and the server 250, shown in FIG. 2, may take the form of various types of computing devices, such as, for example, the computing device 100 described above with reference to FIG. 1. By way of example only and not limitation, the client device 210 and/or the server 250 may be a personal computer, desktop computer, laptop computer, consumer electronic device, handheld device (e.g., personal digital assistant), various servers, processing equipment, and the like. It should be noted, however, that the invention is not limited to implementation on such computing devices but may be implemented on any of a variety of different types of computing devices within the scope of embodiments of the present invention.

Typically, each of the devices 210 and 250 includes, or is linked to, some form of a computing unit (e.g., central processing unit, microprocessor, etc.) to support operations of the component(s) running thereon (e.g., task group identifying component 205, query class composer 255, instant answers component 258, and the like). As utilized herein, the phrase "computing unit" generally refers to a dedicated computing device with processing power and storage memory, which supports operating software that underlies the execution of software, applications, and computer programs thereon. In one instance, the computing unit is configured with tangible hardware elements, or machines, that are integral, or operably coupled, to the devices 210 and 250 to enable each device to perform communication-related processes and other operations (e.g., capturing a dictionary 231 from a data store 230, generating task groups 270, and the like). In another instance, the computing unit may encompass a processor (not shown) coupled to the computer-readable medium accommodated by each of the devices 210 and 250.

Generally, the computer-readable medium includes physical memory that stores, at least temporarily, a plurality of computer software components that are executable by the processor. As utilized herein, the term "processor" is not meant to be limiting and may encompass any elements of the computing unit that act in a computational capacity. In such capacity, the processor may be configured as a tangible article that processes instructions. In an exemplary embodiment, processing may involve fetching, decoding/interpreting, executing, and writing back instructions (e.g., reconstructing the list of terms within the dictionary 231 upon expanding or condensing the terms).

Also, beyond processing instructions, the processor may transfer information to and from other resources that are integral to, or disposed on, the devices 210 and 250. Generally, resources refer to software components or hardware mechanisms that enable the devices 210 and 250 to perform a particular function. By way of example only, the resources accommodated by the server 250 may include one or more of the following: a task group identifying component 205, a query class composer 255, a dictionary component 256, an instant answers component 258, a search engine 275, and an organizing component 280.

The client device 210 may include an input device (not shown) and a presentation device 215. Generally, the input device is provided to receive input(s) affecting, among other things, a presentation of the search results in a browser window 225 surfaced at a UI display area 220. Illustrative devices include a mouse, joystick, key pad, microphone, I/O components 120 of FIG. 1, or any other component capable of receiving a user input and communicating an indication of that input to the client device 210. By way of example only, the input device facilitates entry of a query and controls the location of a selection tool on the search results responsive to the query.

In embodiments, the presentation device 215 is configured to render and/or present the UI display 220 thereon. The presentation device 215, which is operably coupled to an output of the client device 210, may be configured as any presentation component that is capable of presenting information to a user, such as a digital monitor, electronic display panel, touch-screen, analog set top box, plasma screen, audio speakers, Braille pad, and the like. In one exemplary embodiment, the presentation device 215 is configured to present rich content, such as the browser window 225 that includes a display area populated with search results (e.g., digital images). In another exemplary embodiment, the presentation device 215 is capable of rendering other forms of media (e.g., audio signals). In yet another exemplary embodiment, the presentation device 215 may present a portion of the search results in proximity with one of the set of task groups 270, as more fully discussed below.

The data store(s) 230 are generally configured to store information associated with a user-submitted query and/or data generated from previous query results and user interaction therewith, discussed below. In various embodiments, such information may include, without limitation, the dictionary 231 that includes a list of terms from which the task groups 270 are identified, recorded user search behavior (e.g., query logs, related searches list, etc.), and other information 235 that pertains to embodiments of the present invention. In addition, the data store(s) 230 may be configured to be searchable for suitable access of the stored information 235. For instance, the data store(s) 230 may be searchable for one or more user-initiated queries associated with an entity of the gallery of entities. It will be understood and appreciated by those of ordinary skill in the art that the information stored in the data store(s) 230 may be configurable and may include any information relevant to the generation and maintenance of the dictionaries, gallery of entities, task groups, and organization of the search results. The content and volume of such information are not intended to limit the scope of embodiments of the present invention in any way. Further, though illustrated as single, independent components, the data store (s) 230 may, in fact, be a plurality of databases, for instance, a database cluster, portions of which may reside on the client device 210, the server 250, the structured searchable database 201, another external computing device (not shown), and/or any combination thereof.

This exemplary system architecture 200 is but one example of a suitable environment that may be implemented to carry out aspects of the present invention and is not intended to suggest any limitation as to the scope of use or functionality of the invention. Neither should the illustrated exemplary system architecture 200 be interpreted as having any dependency or requirement relating to any one or combination of the computing devices 210 and 250, the storage devices 201 and 230, and components 205, 255, 256, 258, 275, and 280 as illustrated. In some embodiments, one or more of the components 205, 255, 256, 258, 275, and 280 may be implemented as stand-alone devices. In other embodiments, one or more of the components 205, 255, 256, 258, 275, and 280 may be integrated directly into the server 250, or on distributed nodes that interconnect to form the server 250. It will be understood by those of ordinary skill in the art that the components 205, 255, 256, 258, 275, and 280 (illustrated in FIG. 2) are exemplary in nature and in number and should not be construed as limiting.

Accordingly, any number of components may be employed to achieve the desired functionality within the scope of embodiments of the present invention. Although the various components of FIG. 2 are shown with lines for the sake of clarity, in reality, delineating various components is not so clear, and, metaphorically, the lines would more accurately be grey or fuzzy. Further, although some components of FIG. 2 are depicted as single blocks, the depictions are exemplary in nature and in number and are not to be construed as limiting (e.g., although only one presentation device 215 is shown, many more may be communicatively coupled to the client device 210).

Further, the devices of the exemplary system architecture may be interconnected by any method known in the relevant field. For instance, the server 250 and the client device 210 may be operably coupled via a distributed computing environment that includes multiple computing devices coupled with one another via one or more networks 208. In embodiments, the network 208 may include, without limitation, one or more local area networks (LANs) and/or wide area networks (WANs). Such networking environments are commonplace in offices, enterprise-wide computer networks, intranets, and the Internet. Accordingly, the network is not further described herein.

In operation, the components 205, 255, 256, 258, 275, and 280 are designed to perform a process that includes, at least, the steps of selecting task groups 270 from the dictionary 231, associating the task groups 270 with one or more entities in the gallery of entities (associated with both the dictionary 231 and a query class), and sorting and exposing the search results based on the task groups 270. Initially, the dictionary component 256 is responsible for generating and updating a list of terms, or dictionary 231, that is associated with a particular query class. In one instance, with respect to generating the list of terms, the dictionary 231 is pulled from a source external to the server 250, such as the data store(s) 230. In another instance, the dictionary 231 is compiled from data feeds that pass through the search engine 275.

Further, the dictionary component 256 is configured to update the list of terms within the dictionary 231. In on sense, updating the dictionary 231 involves expanding the list of terms by discovering terms that are equivalent to the terms already compiled in the dictionary. Generally, expanding the list of terms involves the steps of scanning the structured searchable database 210 to identify relevant terms that share a common categorization with the query class (associated with the dictionary), and expanding the composition of the list of terms by applying the relevant terms to update the list of terms. The updated list of terms 241 may be used to replace the current list of terms within the dictionary 231. The procedure of scanning the structured searchable database 201 to identify relevant terms that share a common categorization with the query class initially includes the step of mining the structured searchable database 201 for topics that categorize the gallery of entities assembled to form the query class. In embodiments, mining the structured searchable database 231 may comprise employing a dictionary-expansion algorithm that crawls through the structured searchable database 201, or other databases, to find terms that are similar to terms in the current list of terms. With reference to FIG. 2, the information exchanged between the dictionary component 256 and the structured searchable database 201, when mining, is depicted by reference numeral 240.

In one instance, the structured searchable database 201 is the Wikipedia® website. In this instance, the dictionary-expansion algorithm inspects the Wikipedia® website to find categories therein that sort searchable words. Those searchable words that are sorted into categories that are relevant to the list of terms are incorporated into the list of terms, thereby building a more comprehensive dictionary.

By way of example, if the query class is "musicians" and the list of terms within the dictionary 231 substantially includes the names of individual musicians and musical groups, a dictionary-expansion algorithm may be employed to expand the dictionary 231 associated with musicians by pulling the names of other musicians and musical groups from Wikipedia®. Initially, data within Wikipedia® is scanned to understand what categories therein mainly feature musicians. Then, a score is associated with each of the topics upon determining an entity of the gallery of entities or a term of the list of terms is categorized by that topic. For each additional entity or gallery that corresponds with that topic, the associated score is incrementally increased. For instance, if the query class relates to musicians and the term "Jennifer Lopez" of the dictionary associated with musicians is used to interrogate Wikipedia®, it is likely that the topic "American Actor/Singers" will be identified as being relevant. As such, a score associated with this topic will be incremented because the dictionary-expansion algorithm considers this topic to be related to a list of other singers. Then, another musician (e.g., Prince) may be used to interrogate the topics of Wikipedia®.

Upon applying each term in the dictionary 231 to Wikipedia®, the result will be a set of topics that each has a score associated therewith. These scores may be compared against each other to distill a set of highest scoring topics from the topics. Accordingly, a composition of the list of terms may be expanded by incorporating terms categorized by the highest scoring topics into the list of terms. For instance, the term "Madonna" may not be initially included in the dictionary, but may be associated with one of the highest scoring topics of the structured searchable database 201 (e.g., American Actor/Singers). Accordingly, the dictionary 231 will likely be expanded to include the musician Madonna upon exercising the dictionary-expansion algorithm.

Although Wikipedia® is used as an exemplary model for describing the expansion of the list of terms within a dictionary 231, it should be understood and appreciated that the structured searchable database 201 may be practiced by various components which are different from the specific illustrated embodiment. Therefore, it is emphasized that the invention is not limited only to its embodiment pertaining to Wikipedia®, but is embracing of a wide variety of mechanisms which fall within the spirit of the following claims.

Besides updating the dictionary 231 by way of expansion, the dictionary 231 may also be updated by condensing the list of terms. In one embodiment of condensing, the dictionary component 256 may be employed to scan the structured searchable database 201 in order to identify equivalences between terms within the list of terms. Scanning can include mining the structured searchable database 201 for redirects that indicate synonymous terms. For a given term, "redirects" facilitate finding the various ways users search for a particular entity. Accordingly, redirects within a database provide an indication that the terms connected by the redirect are equivalent terms—at least from the perspective of an administrator maintaining the database. By way of example, if the structured searchable database 201 is Wikipedia® and the term from the dictionary 231 being tested via Wikipedia® is "J Lo," a redirect may cause a webpage referencing "Jennifer Lopez" to surface. As such, this redirect signifies that "J Lo" and "Jennifer Lopez" have similar meanings to users who conduct a search for that musician/actress.

Next, upon detecting a redirect and identifying synonymous terms associated therewith, the dictionary component 256 may ascertain that the identified synonymous terms appear in the list of terms. If both of the synonymous terms do appear in the dictionary, the composition of the list of terms is condensed by removing one of the synonymous terms and by linking the removed, or extraneous, term to the retained term. In other words, the synonymous terms are stitched together to reduce redundancy.

In another embodiment of condensing, an overlap between terms in the dictionary 231 is recognized by the dictionary component 256 upon reviewing click-through behavior of users. As discussed above, this click-through behavior may be extracted from one or more of the data stores 230, which remotely persists user search behavior 232. In this embodiment of condensing, the historical click-through data generated by each entity in the gallery of entities is analyzed. Based on the analysis, terms in the list of terms that are invoked at a similar click distribution are identified. In one instance of identifying, a correlation factor is assigned to pairs or groups of terms whose click distributions exhibit a high level of correlation. This high level of correlation indicates that the terms overlap in concept and are considered equivalent by users. As such, the composition of the list of terms may be condensed by removing one or more of the terms identified as overlapping another term.

In still another embodiment of condensing, generic terms are identified and removed from the dictionary. Initially, identifying generic terms involves analyzing patterns across queries, where the queries may be drawn from the user search behavior 232. Typically, the queries that are reviewed include as a component the entities from the gallery of entities associated with the dictionary. Based on the analysis, terms are identified as generic when they appear frequently in the queries in conjunction with entities from the entity gallery. Specifically, terms are generic when they frequently modify multiple and differing entities within a query. By way of example, if the term "biography" is identified in queries that are associated with many various musicians, such as "Jennifer Lopez," "Prince," and the like, then "biography" may be identified as generic. Once identified, the composition of the list of terms is condensed by removing the generic, or extraneous, term(s).

Referring now to the query class composer 255 residing on the server 250, the process of building a query class 260 will now be discussed. Generally, as discussed above, the query class broadly represents a collection of queries that share a common theme, characteristic, and/or attribute. For instance, the queries that include as a component "Backstreet Boys," "Madonna," and "Dave Matthews" all share the common theme of being musicians and, thus, would be grouped together to form a query class by the query class composer 255. These queries that are inspected and grouped may be mined from any database (e.g., structured searchable database 201, data stores 230, etc.), local or remote, that is accessible to the server 250.

The task group identifying component 205 is generally configured to receive the query class 260 (provided by the query class composer 255) and the updated dictionary 241 (provided by the dictionary component 256) and generate a set of task groups 270 for each of the query classes 260 utilizing the list of terms within the updated dictionary 241. In an exemplary embodiment, an overall method for generating task groups 270 involves, at least, the following steps: (a) analyzing patterns of the user search behavior 232 to select one or more terms from the list of terms that reflect popular user search intents; (b) ranking the terms based on predetermined parameters to produce an ordering; and (c) based on the ordering, identifying a set of the terms that are highest ranked as the task groups 270. These task groups 270 may be stored in association with the appropriate query class 260 on computer-readable media accommodated by the server 250 or on a remote physical memory.

In one embodiment, the step of analyzing patterns of the user search behavior 232 may involve enumerating the most common modifiers (e.g., suffix and prefix) that appear in queries either before or after entities from the gallery of entities associated with the query class 260. For instance, enumerating may include counting the number of times a modifier is used as a query suffix or prefix to the entities in the gallery. If the count is comparably high when compared against other modifiers being examined, then the modifier is earmarked as a candidate for becoming a task group 270. By way of clarification, "prefixes" are typically modifiers (e.g., terms, phrases, text strings, alphanumerical characters, etc.) that precede one or more terms that map to at least one of the entities in the query class 260. On the other hand, "suffixes" are typically modifiers that follow one or more terms that map to at least one of the entities in the query class 260. Further, modifiers may correspond to one or more terms in the dictionary 231 assigned to the query class 260.

By way of example, with reference to the queries "parts for Audi S8" (where parts is a prefix modifier of the entity Audi S8) and "Audi S8 parts" (where parts is a suffix modifier of the entity Audi S8), the count for the modifier "parts" would be increment by two. Accordingly, in this example, the term "parts" reflects a common, or top, task that users desire to perform when searching within the query class of "cars." In operation, search results that are responsive to a query (e.g., "Porsche") associated with the query class of "cars" will be grouped based on the task group of "parts," among other task groups relevant to "cars."

In another embodiment, as opposed to tracking a count of usage for a modifier of an entity, a frequency of appearance in queries as a suffix or prefix may be compiled. Accordingly, based on the frequency, the most common modifiers (e.g., prefixes and suffixes) may be identified. Stated another way, the method for identifying the task groups 270 using frequencies of appearance may include the following steps: accessing a query log (e.g., user search behavior 232) that includes a plurality of user-initiated queries corresponding to the entities designated as part of the query class 260; analyzing components of each of the user-initiated queries to identify one or more terms that map to one of the entities and to identify modifiers of these terms; compiling a set of modifiers that most frequently occur as a component within the user-initiated queries; and establishing the most-frequently-occurring set of modifiers as the task groups 270. These most-frequent modifiers both capture and indicate a strong association between the modifier and the tasks or intents commonly performed by users during a search. As such, the task groups 270 that are derived from the most-frequent modifiers may apply to all, or at least a large portion, of the entities or queries that are associated with the query class 260. Further, because any number of queries may be inspected to ascertain the most-frequent modifiers, this process of identifying the top task groups 270 is scalable (e.g., based on computing resources available).

Upon identifying the prefixes and the suffixes that are used in conjunction with an entity in a query, these modifiers may be used to collapse and consolidate the list of terms within the dictionary 231, thereby removing redundant words from the list of terms. Initially, collapsing the dictionary 231 may involve identifying modifiers that are commonly employed to refine a search with a particular entity from the gallery of entities. By way of example, the modifiers "photos" and "images" may be determined to commonly refine a search of a particular entity, such as "Jennifer Lopez." Accordingly, these modifiers may be associated with each other, or clustered. These clusters represent a similar intent of users when searching for a digital representation of Jennifer Lopez. Then, the associated modifiers (prefixes and suffixes) may be moved to a single entry of the dictionary 231 in order to collapse the list of terms. In another instance, one of the modifiers may be identified as extraneous and removed from the list of terms.

In a second exemplary embodiment of identifying the top task groups 270, the process of identifying relies heavily on historical user reactions to the results of a query. This second embodiment of the task group 270 identification process involves, but is not limited to, the following steps: accessing a related-searches list (e.g., the user search behavior 232); and performing a session analysis utilizing the related-searches list. Typically, the related-searches list includes terms from the dictionary 241 that are offered to users while conducting a search with an entity from the gallery of entities. In instances, the process of performing a session analysis involves compiling historical reactions of the users when selecting one or more of the terms in the related-searches list, identifying a set of the terms in the related-searches list that have most-frequently received a positive reaction from the users, and establishing the identified set of terms as the task groups 270.

With reference to the step of compiling historical reactions of the users when selecting terms appearing in the related-searches list, an occurrence of a user-selection indicates that the users are attempting to narrow their search by incorporating terms from the dictionary 231 into a query. Further, with reference to the step of identifying the terms that have most-frequently received positive reaction from users, the "positive reaction" may include a click-through on a term from the related-searches list, a selection on a follow-on webpage rendered in response to the click-through, another type of user interaction when navigating the Internet or intranet, and/or any combination of these actions.

In another embodiment, the step of performing session analysis includes examining previous queries that are not limited to suffixes and prefixes of an entity in the gallery. In one instance, session analysis is performed with sequential queries, which are typically pairs of queries that users issued in sequence (e.g., second query is issued after a first query by a particular user within a limited time window). In other instances, the sequential queries may be a string of any number of queries, where the number is predetermined by the task group identifying component 205. In some instances, these related pairs of queries may be recovered from a related-searches list that is used to offer users a choice of related searches in response to a query. These sequential queries may be identified and aggregated over a multitude of users in order to gain a comprehensive perspective of searching preferences, intents, and common tasks. Accordingly, the sequential pairs provide an insight as to what users commonly search for, and what is selected or engaged with during a particular search or refinement path of the search.

By performing a session analysis that includes examining user behavior with relation to a search refinement (e.g., clicking on a term, clicking on a second page, and the like), it is possible to determine those triggered query suggestions within a related-searches list that are most popular and/or relevant to a query topic. These popular query suggestions, which also appear in the list of terms, may be aggregated across the available session data to compile a most-common set of related searches from the queries within the gallery.

In embodiments, a related-searches model is used to rank the resulting set of related searches. In one instance, the related-searches model ranks based on user feedback in a session log and normalizes the ranked related searches to produce a set of task groups 270 within the query class 260. This ranking may be based on how likely a user is to click-through a suggested related search, as described above. As such, the related-searches model is able to predict the value of a related search to a user issuing a particular query based how likely a user is to select an initial suggested related search and/or how likely the user is to then click on a subsequently suggested related search surfaced by the initial related search (e.g., calculating the click-probability for each suggested related search offered in response to, or relevant, to a query).

Typically, the value of each related search to a user is recorded as a score. By way of example, the score for a particular related search may be incremented by one point if an initial click-through is received at the related search upon being offered to a user. Alternatively, the score of the related search may be incremented by ten points if a follow-on page or additional related search is selected upon receiving the initial click-through. In another instance of scoring a related search, the selection on the follow-on page is generally weighted higher than, or equal to, the weight attached to the click-through. In yet another instance, the score for a related search is penalized for surfacing a follow-on page that does not receive a follow-on click. As such, this score (e.g., number of many times a user selects the related search "parts" upon typing the query "Audi"), which is used to rank the related searches to determine the task groups 270 therefrom, serves as a trustworthy indicator of user intents when performing a search of the particular query within the query class 260.

Although two different events (e.g., click-through and selection after click-through) for gauging a value of a related search to a user have been described, it should be understood and appreciated by those of ordinary skill in the art that other types of suitable events that provide an indication of user intents when searching may be used, and that embodiments of the present invention are not limited to those particular events described herein.

Once the most common modifiers or related searches are identified by the processes described above, the modifiers or related searches are ranked based on predetermined parameters, and the highest ranking modifiers or related searches are selected as the task groups 270. In one instance, the "predetermined parameters" pertain to the score determined for each related search, which captures a strength of the positive reaction from the users. In another instance, "predetermined parameters" pertain to a number of entities in the gallery that each term in the dictionary 231 modifies, as a prefix or suffix, within the inspected queries. Although two different configurations of the predetermined parameters have been described, it should be understood and appreciated by those of ordinary skill in the art that other types of suitable factors may be used rank the modifiers or related searches, and that embodiments of the present invention are not limited to those predetermined parameters described herein. For instance, the scores of the related searches, or the number of times a modifier is used, may be employed to compile a set of relevant related searches or modifiers that reflect top intents, while a third method may be used to rank those related searches or modifiers within the set.

In other embodiments, the task group identifying component 205 is responsible for filtering the task groups 270 (identified above) utilizing criteria, where the task groups 270 that satisfy the criteria are persisted while the task groups 270 that do not meet the criteria are disqualified. In one instance, the criteria pertains to ascertaining whether the task group includes a timeframe component. By way of example, if the task group "2009 Audi" is identified, it is disqualified for having the timeframe component of "2009." As a general rule, timeframe components are disqualified because they become obsolete rapidly and often detract from more relevant task groups.

In another instance, the criteria pertains to ascertaining whether the task group includes as a component an entity from the gallery of entities aggregated to form the query class. By way of example, if the task group "Parts" is identified, it is disqualified for not including an entity from the gallery associated with the query class "cars." However, with continued reference to this example, the task group "Audi parts" would not be filtered. As a general rule, the modifier should be paired with an entity to ensure that a search executed within the task group returns search results that relate to the query class, as opposed to a overbroad search that is responsive to just the modifier (e.g., searching just "parts" as a query may collect search results that do not correspond with "Audi" or "cars").

Once the set of task groups 270 is identified, ranked, and filtered, the top task groups 270 are associated with one or more entities of queries that make up the query class 260, or are associated with the query class itself. When the task groups 270 are associated with an individual entity of the gallery, the search results that are responsive to a query that include the entity are organized based on task groups 270. However, when another entity in the query class 260 is included in a query, a search based on that query may generate search results that are organized according to a different set of task groups 270. When the task groups 270 are associated with the query class 260, the search results that are responsive to a query comprising any entity in the query class 260 will by similarly organized based on one set of task groups 270. Generally, the task groups 270 are assigned to an entity when entity-specific historical search data was used to generate the task groups 270, while the task groups 270 are assigned to the query class 260 when category-wide historical search data was used to generate the task groups 270.

In one instance, the process for assigning the task groups 270 to an entity that is a member of the query class 260 includes the steps of identifying the task groups 270 from the list of terms within the updated dictionary 241 for the entity of the gallery of entities, and ranking the task groups 270 associated with the entity based on the predetermined parameters. Accordingly, the task groups 270 associated with a first entity of the gallery of entities may vary from the task groups 270 associated with a second entity of the gallery of entities for the same query class 260.

In another instance, the process for assigning the task groups 270 to an entity that is a member of the query class 260 includes the step of recognizing that the entity in the gallery of entities lacks sufficient user search behavior to derive the popular user search intents at a high level of accuracy (e.g., insufficient history of click-throughs or search data to accurately predict the top task groups 270). Upon recognizing there is insufficient historical user behavior associated with the entity, the process for assigning the task groups 270 to the entity may further include the step of applying the task groups 270 established for another entity in the gallery of entities to the recognized entity. By way of example, some obscure musician may be represented by an entity in a gallery of entities associated with the query class of "musicians." If the task group identifying component 205 recognizes that queries that included the obscure musician as a component were infrequent or generated inconsistent user reactions to related searches, task groups from another, more popular, musician in the query class of "musicians" may be applied to the obscure musician.

In one instance, applying involves supplanting the obscure musician's task groups with those of another musician. In another instance, applying includes blending some of the obscure musician's task groups with task groups associated with another musician, or associated with the query class of "musicians," to form a conglomerate set of task groups. In forming the conglomerate set of task groups, the task groups associated with each entity may be blended based on a weighting (e.g., derived from an amount of supportive search history, confidence in the underlying computation of the task groups, etc.). In embodiments, a logistic regression model may be used to facilitate blending, where the logistical regression model analyzes the historical impressions and search behavior supporting the selection of each task group, and weighting the task groups based on the analysis.

Moving on to the answers component 258, a discussion of the procedure for generating instant answers 259 will follow immediately below. "Instant answers" 259 as used herein, generally encompass those search results and/or task groups that are artificially created or deliberately selected in response to a query, as opposed to web-generated results. By way of example, an instant answer to a search for "Jennifer Lopez" may be a task group of "photos" with content items including digital images associated therewith. Accordingly, the instant answer 259 may be a task group within the set of top task groups 270 that is placed there intentionally (outside the processes for selecting the task groups 270 outlined above). In one instance, an administrator of the server 250 may manually place the instant answer 259 within the set of top task groups 270. In another instance, a program running on the server 250 may automatically place the instant answer 259 within the set of top task groups 270 in response to detecting certain conditions. Generally, the instant answer 259, like the task groups 270, reflects common intents of users when conducting a search with a specific query.

The search engine 275 is generally configured to receive a query 285 from the client device 210 and provide search results 290 to an organizing component 280. Further, in one instance, the search engine 275 is designed for searching for information on the Internet for gathering Internet search results in response to the user-submitted query 285 that may be submitted through a website. In one embodiment, the search engine 275 includes one or more web crawlers that mine available data (e.g., newsgroups, databases, the data stores 230, or open directories) accessible via the Internet and build a table containing web addresses along with the subject matter of web pages identified as the search results 290 that are relevant to search terms within the user-submitted query 285. The search engine 275 may be accessed by Internet users through a web-browser application running on the client device 210. Accordingly, the users may conduct an Internet search by submitting search terms at a query-entry area on the UI display 220 presented on the web-browser application that is associated with the search engine 275. Further, the search engine 275 may then retrieve the search results 290 that match the user's search terms in the query 295.

In embodiments, the organizing component 280 is configured to receive the query 285 issued by the user and select the set of top task groups 270 based on the query 285. In one instance, selecting the set of top task groups 270 involves a procedure comprising the steps of receiving the user-issued query 285, composed of search terms that map to an entity associated with one or more query classes, and, incident to receiving the user-issued query 285, selecting the query class 260 from the query classes, and recognizing the task groups 270 associated with the selected query class 260. Typically, the step of selecting the query class 260 from the query classes includes reviewing the entities in the gallery associated with each of the query classes, and, upon review, targeting the query class 260 that reflects a gallery of entities that are most frequently associated with the search terms within the user-issued query 285.

Additionally, in embodiments, the organizing component 280 is configured to receive the search results 290 gathered by the search engine 275 that are responsive to the query 285, and to receive the instant answers 259 related to the query 285 from the instant answers component 258. These search results 290 and instant answers 259 are combined and organized utilizing the set of top task groups 270. Next, the organizing component 280 is configured to instruct the presentation device 215 to render on the UI display 220 the organized search results and instant answers 295 proximate to each of the task groups 270 with which each of the search results 290 or instant answers 259 corresponds, respectively.

Figure 8:
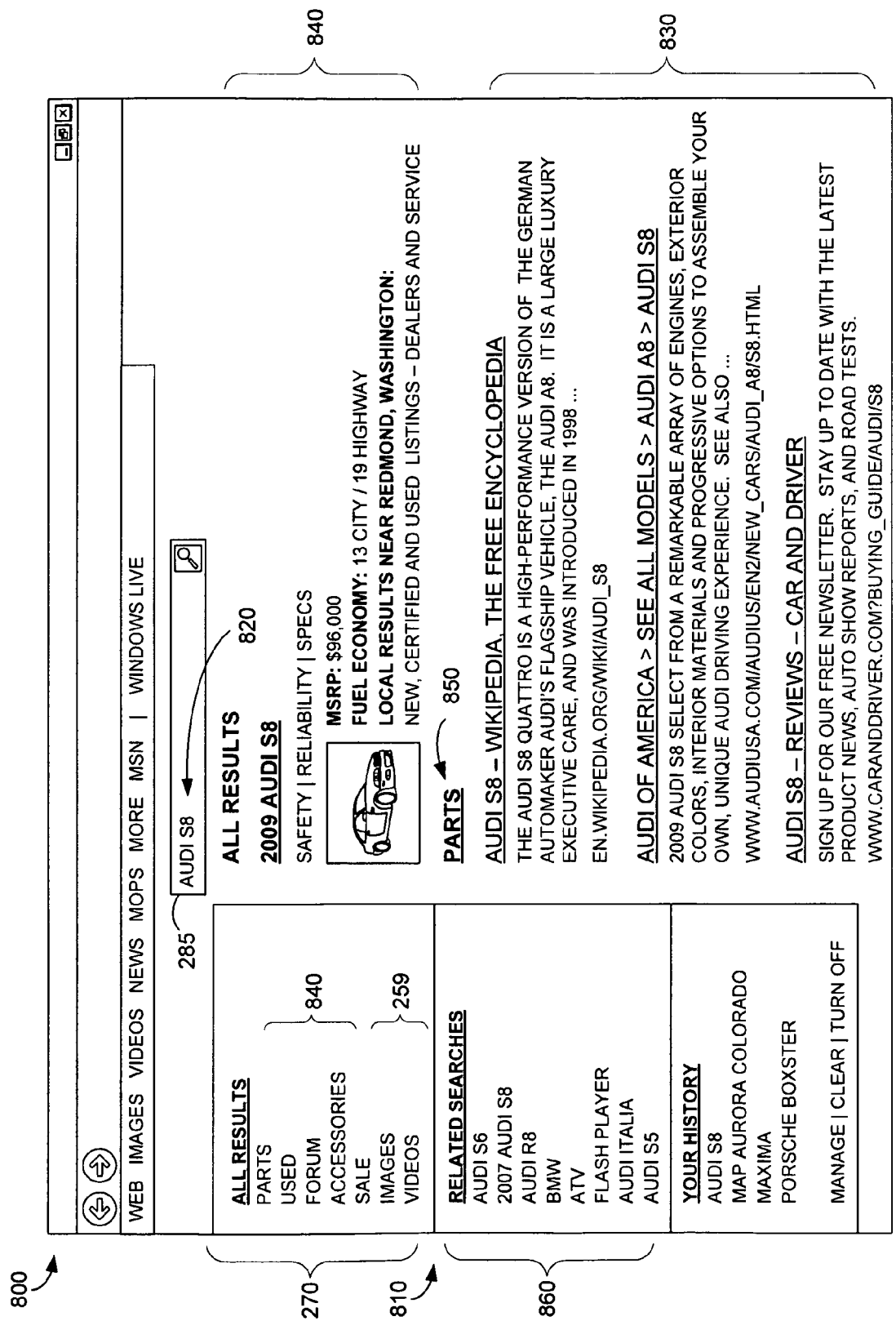
FIG. 8 is an illustrative screen display of exemplary user interface for presenting search results organized by task groups along with various features that are derived from analyzing patterns of user search behavior.

Referring to FIG. 8, the process of rendering the organized search results and instant answers 295 proximate to each of the task groups 270 will now be discussed. Generally, FIG. 8 is an illustrative screen display of exemplary user interface 800, often displayed within the browser window 225 of FIG. 1, for presenting the search results organized by task groups 270 along with various features that are derived from analyzing patterns of user search behavior. Further, exemplary user interface 800 FIG. 8 is rendered in accordance with an embodiment of the present invention, and is not meant to limit the scope of representations that can express search results 290/instant answers 259 organized by task groups 270.

Initially, a search entry area 820 is provided for accepting the query 285. Upon entering the query 285, the corresponding task groups 270 are selected. Typically, at least a portion of the selected task groups 270 are rendered at the exemplary user interface 800. In one instance, the selected task groups 270 are listed in a table of contents (TOC) 810 placed in a strategic location on the exemplary user interface 800. As shown, the TOC 810 is positioned as a right-rail panel. A set of automatically generated related searches 860 may be presented upon issuing the query 285. As shown, the related searches 860 are relevant to narrowing the query 285 and are published within the TOC 810.

The rendered task groups 270 may include those originally selected task groups 840 (e.g., based on analysis of the user search behavior 232 of FIG. 2), as well as the instant answers 259 (e.g., generated by the instant answers component 258 of FIG. 2). Further, a portion of the search results 830 organized by the task groups 270, which are responsive to the query 285 in conjunction with the first of the task groups "Parts" 850, are listed below a heading that describes the first task group "Parts" 850. Further, another portion of the search results (not shown), which are responsive to a search using the second of the task groups "Used," may be located further down the exemplary user interface 800 below a heading that describes the second task group "Used." Accordingly, as shown, the organized search results 830 are arranged as a block on a webpage, or page element, specific to one of the task groups 270.

By grouping together the organized search results 830, the user is quickly directed to, and able to easily identify, the type of results that are associated with one of the task groups 270. This concept may be applied to navigational galleries (i.e., queries with navigational intents) (e.g., Yahoo, Facebook, and the like), where the users intend to navigate directly to a particular site. That is, by grouping the results related to the navigational galleries in a block under a heading reflecting a task group of "Navigational Gallery" (not shown), it is easier for users to get to a particular site because the results are in a category unto themselves.

In embodiments, certain task groups of the listed task groups 270 may be associated with a certain media type. For instance, the "Images" task group may include search results that are digital images of the query 285, as opposed to text. Similarly, the "Videos" task group may include search results that link to video files associated with the query 285.

As discussed above, each of the task groups 270 (e.g., "Parts," "Used," "Forum," "Accessories," etc.) each have a distinct set of search results associated therewith and, typically, presented in proximity therewith. Often, a same number of the search results is presented with each of the task groups 270, in order to provide the user with a consistent search experience. These blocks of search results will become visible as a user scrolls upward or downward on the exemplary user interface 800.

In embodiments, each of the task groups 270 are provided with a selectable link, where the link navigates to a separate UI that lists those search results related to a particular task group. Accordingly, if a user desires to view a comprehensive list of search results that relate to a specific task group, a selection (e.g., user-click action) may be applied to one of the task groups 270. This separate UI may include some of the features presented on the exemplary user interface 800 and remove others (e.g., the TOC 810).

As shown in the illustrated embodiment, a top-tanked document 840 of the search results may be granted a predominant position on the exemplary user interface 800. In an exemplary embodiment, the top-ranked document 840 is a rich multimedia snippet of data. That is, the top-ranked document 840 may be a highest placed search result that includes a portion of text from a webpage and/or a digital image preview.

Figure 3:
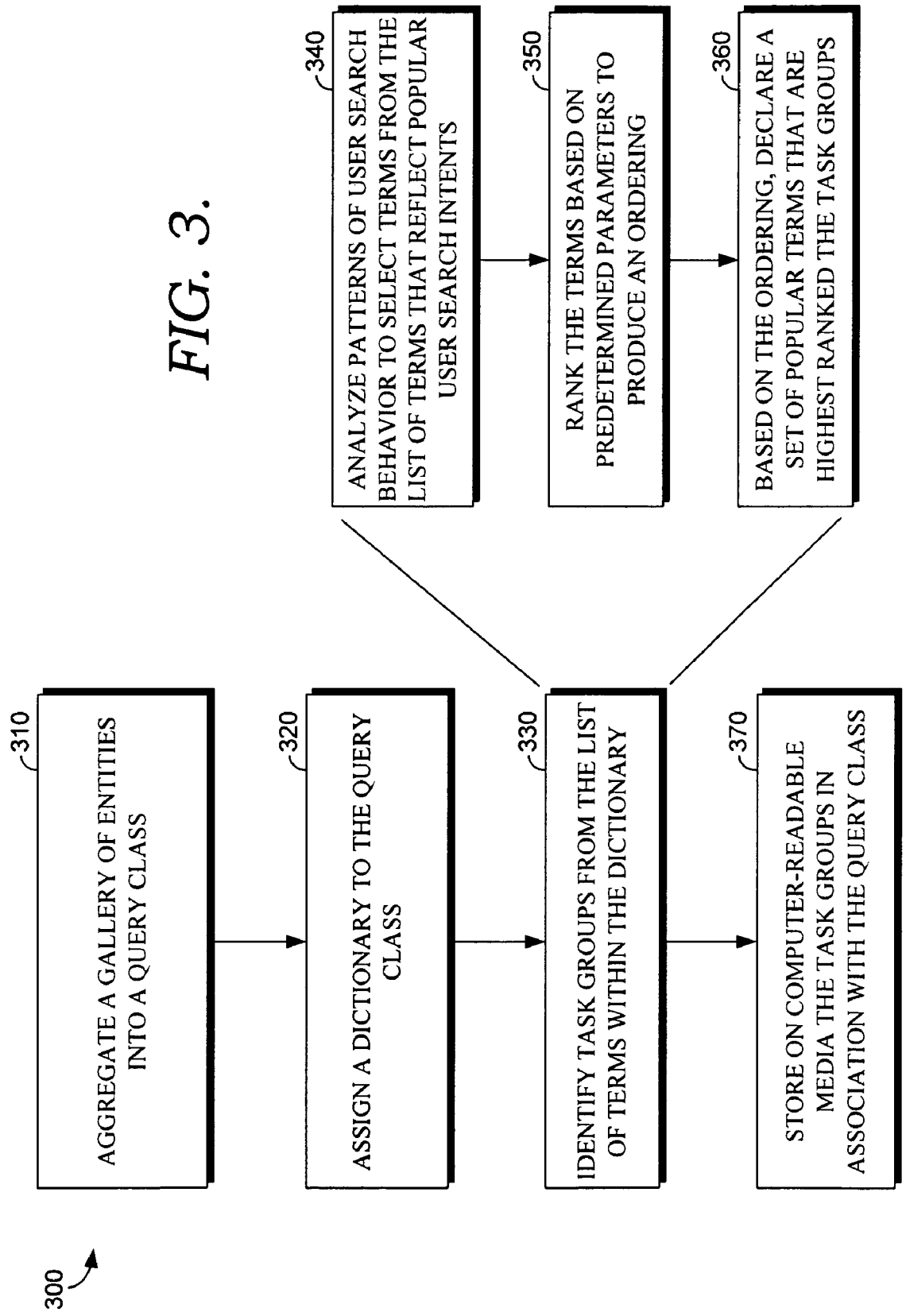
FIG. 3 is a flow diagram illustrating an overall method for automatically organizing search results according to task groups, in accordance with an embodiment of the present invention.

Turning now to FIG. 3, a flow diagram illustrating an overall method 300 for automatically organizing search results according to task groups is shown, in accordance with an embodiment of the present invention. Although the terms "step" and/or "block" may be used herein to connote different elements of methods employed, the terms should not be interpreted as implying any particular order among or between various steps herein disclosed unless and except when the order of individual steps is explicitly described.

Initially, a gallery of entities is aggregated into a query class, as depicted at block 310. As defined above, the "gallery of entities" generally corresponds to queries that share a common categorization. As depicted at block 320, a dictionary is assigned to the query class. Also defined above, the "dictionary" comprises a list of terms that are drawn from one or more sources (e.g., retrieved from the data stores 230 of FIG. 2). The task groups are identified from the list of terms within the dictionary, as depicted at block 330. In an exemplary embodiment, the process for identifying the task groups includes, at least, the steps of analyzing patterns of user search behavior to select one or more terms from the list of terms that reflect popular user search intents (see block 340), and ranking the selected terms based on predetermined parameters (e.g., frequency of use in a query, number of entities that correspond to terms, and the like) the to produce an ordering. As depicted at block 360, a set of the terms, which are highest ranked based on the ordering, are considered to be the task groups. As depicted at block 370, the task groups are persisted, at least temporarily, in association with the query class.

Figure 4:
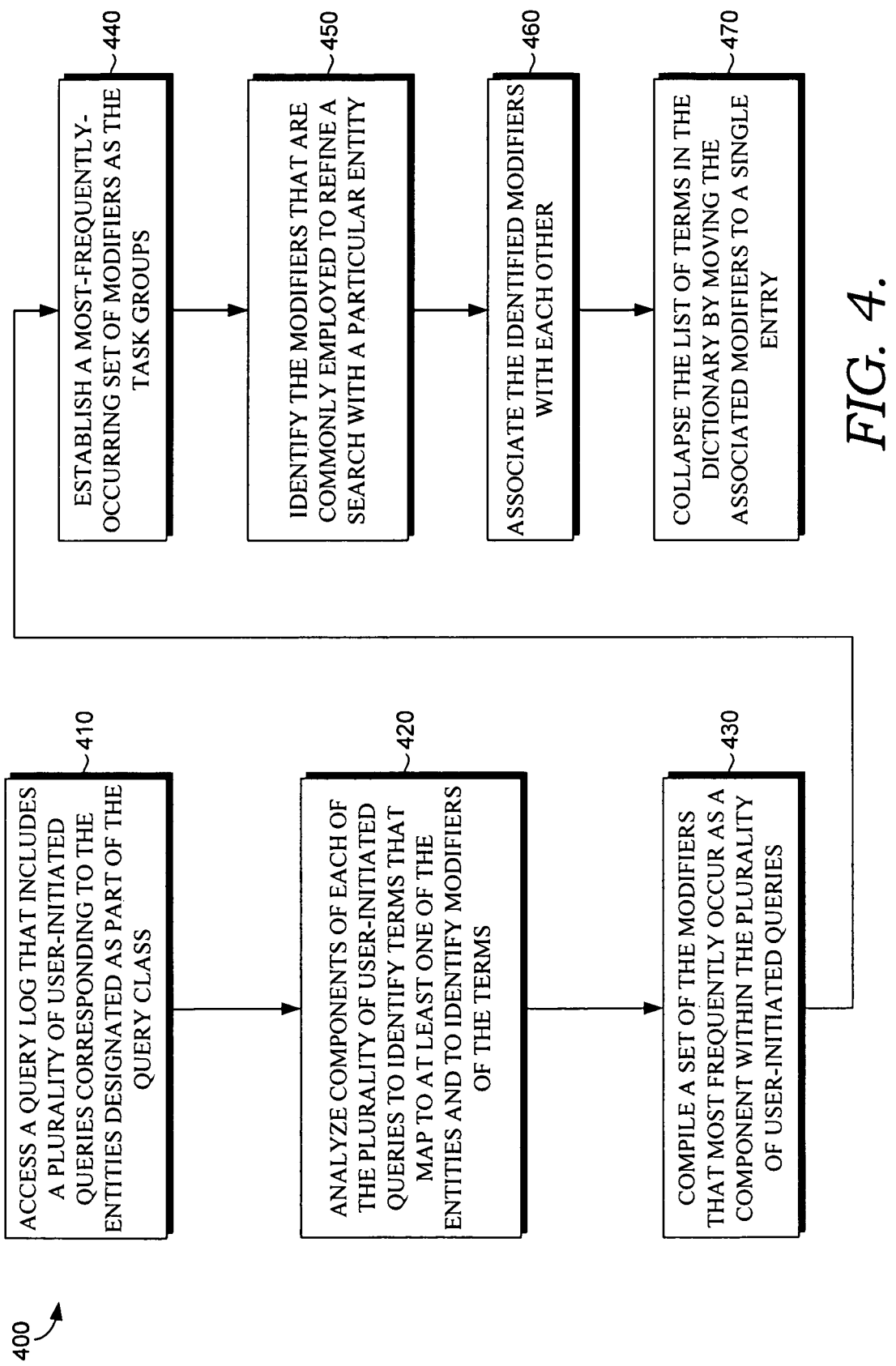
FIG. 4 is a flow diagram illustrating an overall method for collapsing a list of terms within a dictionary by analyzing components of a query, in accordance with an embodiment of the present invention.

With reference to FIG. 4, a flow diagram illustrating an overall method 400 for collapsing a list of terms within a dictionary by analyzing components of a query is shown, in accordance with an embodiment of the present invention. Initially, a query log is accessed, as depicted at block 410. Typically, the query log includes a plurality of user-initiated queries corresponding to the entities designated as part of the query class. As depicted at block 420, components of each of the plurality of user-initiated queries are analyzed to identify one or more terms of the dictionary that map to at least one of the entities. Also, the plurality of user-initiated queries are analyzed to identify modifiers of the one or more terms. Typically, the modifiers include prefixes, which precede the terms that are identified as mapping to the entities in the query class, or suffixes, which follow the terms that are identified as mapping to the entities in the query class. Further, in embodiments, the modifiers correspond to terms in the dictionary assigned to the query class.

As depicted at block 430, a set of the modifiers that most frequently occur as a component within the plurality of user-initiated queries is compiled. In addition, as depicted at block 440, a most-frequently-occurring set of modifiers is established as the task groups. The modifiers (prefixes and the suffixes) that are commonly employed to refine a search with a particular entity from the gallery of entities are identified, as depicted at block 450. These identified modifiers are associating with each other, as depicted at block 460. As depicted at block 470, the list of terms in the dictionary is collapsed by moving the associated modifiers to a single entry within the dictionary.

Figure 5:
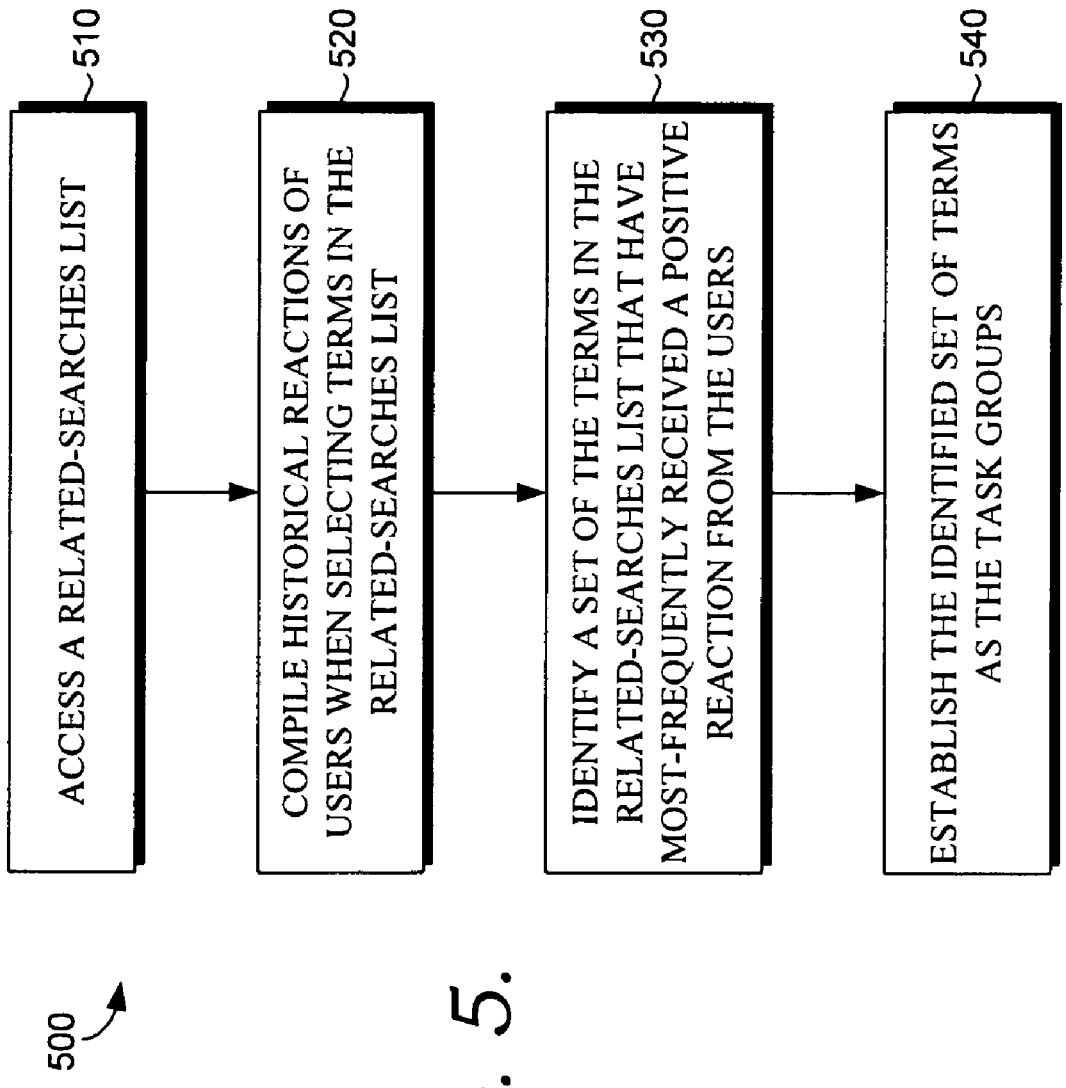
FIG. 5 is a flow diagram illustrating an overall method for utilizing a user's reactions during a search to identify terms in the dictionary as task groups, in accordance with an embodiment of the present invention.

Referring now to FIG. 5, a flow diagram illustrating an overall method 500 for utilizing a user's reactions during a search to identify terms in the dictionary as task groups is shown, in accordance with an embodiment of the present invention. Initially, as depicted at block 510, a related-searches list is accessed. As defined herein, the "related-searches list" typically includes terms from the dictionary that are offered to users while conducting a search. In embodiments, the search is conducted by entering a query that includes as a component an entity from the gallery of entities. Eventually, a session analysis is preformed utilizing the related-searches list. In one instance, the session analysis includes compiling historical reactions of the users when selecting the terms in the related-searches list when refining a search (see block 520) and identifying a set of the terms in the related-searches list that have most-frequently received a positive reaction from the users (see block 530).

Examples of the positive reaction provided by the users include a click-through on a term from the related-searches list and a selection on a follow-on webpage rendered in response to the click-through. As depicted at block 540, the identified set of terms are established and stored as the task groups.

Figure 6:
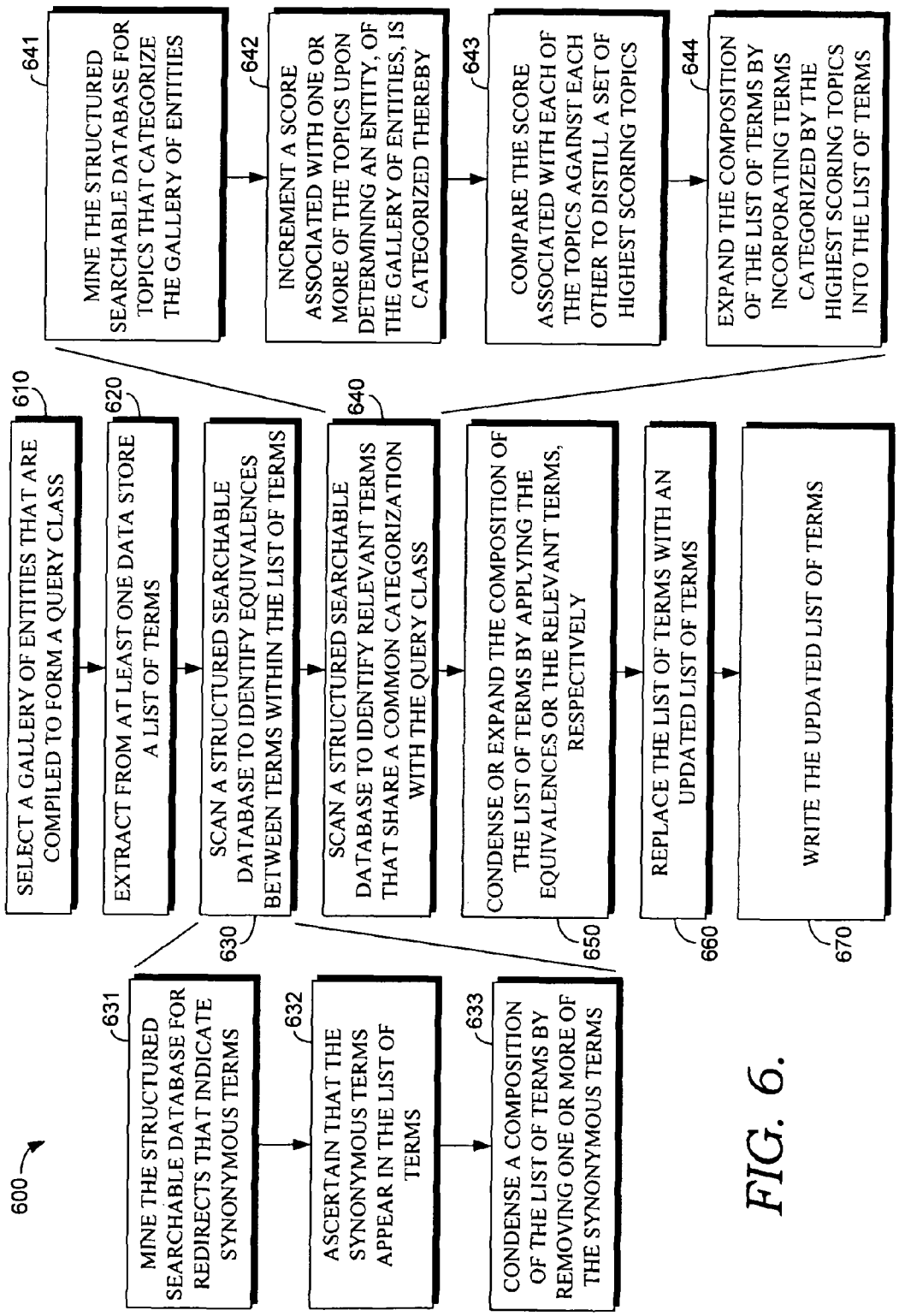
FIG. 6 is a flow diagram illustrating an overall method for manipulating a composition of a list of terms associated with a query class, in accordance with an embodiment of the present invention.

Turning now to FIG. 6, a flow diagram illustrating an overall method 600 for manipulating a composition of a list of terms associated with a query class is shown, in accordance with an embodiment of the present invention. In embodiments, a gallery of entities is compiled to form the query class, as depicted at block 610. Typically, each entity in the gallery of entities corresponds to a query that shares a common categorization (e.g., musicians, cars, cities, and the like) with other queries that are represented by other entities in the gallery of entities. As depicted at block 620, a list of terms is extracted from at least one data store. In one instance, each term in the list of terms is associated with a search refinement path of the query. Typically, the query includes one or more entities compiled in the gallery of entities. A structured searchable database is scanned to identify equivalences between terms within the list of terms, as depicted at block 630.

In an exemplary embodiment, scanning the searchable database to identify equivalences between terms within the list of terms involves performing a process that includes the step of mining the structured searchable database for redirects that indicate synonymous terms, as depicted at block 631. As depicted at block 621, a determination whether the synonymous terms appear in the list of terms is performed. If the synonymous terms do appear in the list of terms, the composition of the list of terms is condensed by removing one or more of the synonymous terms, as depicted at block 633.

Returning to the overall method 600 for manipulating a composition of a list of terms, the structured searchable database is scanned to identify relevant terms that share a common categorization with the query class, as depicted at block 640. In an exemplary embodiment, scanning the searchable database to identify relevant terms that share a common categorization with the query class involves performing a process that includes the step of mining the structured searchable database for topics that categorize the gallery of entities assembled to form the query class, as depicted at block 641. As depicted at block 642, a score associated with one or more of the topics is incremented upon determining an entity, of the gallery of entities, is categorized thereby. The scores, which are associated with each of the topics, are then compared against each other to distill a set of highest scoring topics from the topics, as depicted at block 643. As depicted at block 644, the composition of the list of terms is expanded by incorporating terms categorized by the highest scoring topics into the list of terms.

Again returning to the overall method 600 for manipulating a composition of a list of terms, the composition of the list of terms is condensed or expanded by applying the equivalences or the relevant terms, respectively, to update the list of terms, as depicted at block 650. The list of terms is then replaced with the updated list of terms, as depicted at block 660. As depicted at block 670, the updated list of terms, in association with the query class, is written to a storage location on computer-readable media.

Figure 7:
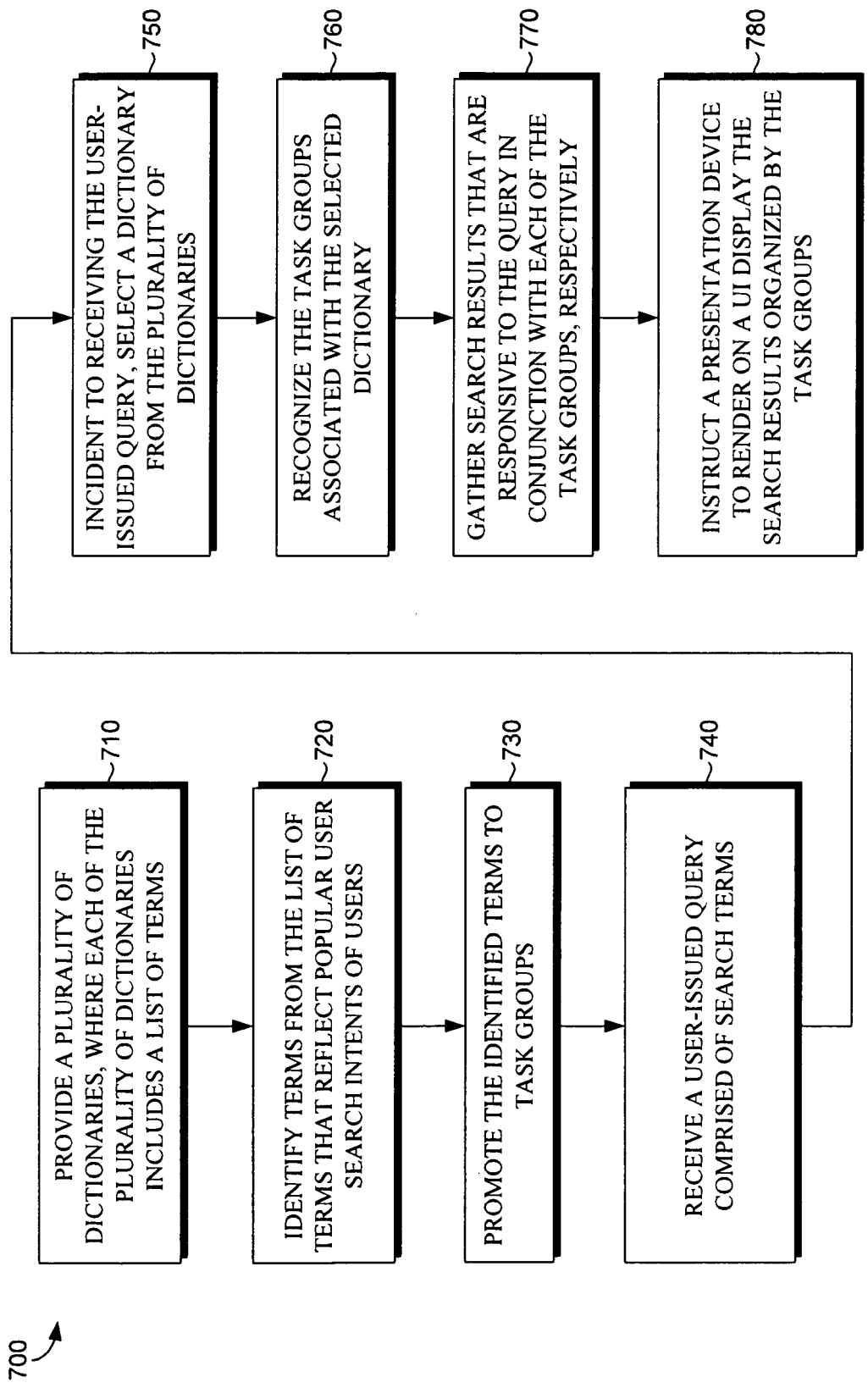
FIG. 7 is a flow diagram illustrating an overall method for utilizing task groups to automatically organize search results on a UI display, in accordance with an embodiment of the present invention.

With reference to FIG. 7, a flow diagram illustrating an overall method 700 for utilizing task groups to automatically organize search results on a UI display is shown, in accordance with an embodiment of the present invention. Initially, the overall method 700 includes the step of providing a plurality of dictionaries, as depicted at block 710. Typically, each of the plurality of dictionaries includes a list of terms. In an exemplary embodiment, each term in the list of terms, at some point, helped refine a search for an entity within a gallery of entities. As discussed above, each entity in the gallery share a common theme with the other entities. As depicted at block 720, one or more terms, from the list of terms, are identified as reflecting popular user search intents of users. Typically, a predefined timeframe is employed for identifying the terms that reflect popular search intents of users. As depicted at block 730, one or more identified terms is promote to the task groups.

Eventually, a user-issued query comprised of search terms may be received, as depicted at block 740. In one instance, the search terms map to an entity associated with one or more of the plurality of dictionaries. Incident to receiving the user-issued query, a dictionary is selected from the plurality of dictionaries, as indicated at block 750. As indicated at block 760, the task groups associated with the selected dictionary are recognized. Search results that are responsive to the query in conjunction with each of the recognized task groups are retrieved, as depicted at block 770. As depicted at block 780, a presentation device is instructed to render on a UI display those search results in a format that is organized by the task groups. In one instance, the format includes blocks of search results that are located proximate to, and correspond with, each of the task groups, respectively.

The present invention has been described in relation to particular embodiments, which are intended in all respects to be illustrative rather than restrictive. Alternative embodiments will become apparent to those of ordinary skill-in-the-art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

The invention claimed is:

1. One or more computer-readable media having computer-executable instructions embodied thereon that, when executed, perform a method for automatically organizing search results according to task groups, the method comprising:
   aggregating a gallery of entities into a query class, wherein the gallery of entities corresponds to queries that share a common categorization;
   assigning a dictionary to the query class, wherein the dictionary comprises a list of terms that are drawn from one or more sources;
   identifying the task groups from the list of terms within the dictionary by utilizing a process comprising:
      (a) analyzing patterns of user search behavior, based on historical user click-through data, to select one or more terms from the list of terms that reflect popular user search intents;
      (b) ranking the one or more terms based on predetermined parameters to produce an ordering; and
      (c) based on the ordering, declaring a set of the one or more terms that are highest ranked the task groups; and
   at least temporarily, storing on the one or more computer-readable media the task groups in association with the query class.

2. The one or more computer-readable media of claim 1, wherein the process of identifying further comprises:
   accessing a query log that includes a plurality of user-initiated queries corresponding to the entities designated as part of the query class;
   analyzing components of each of the plurality of user-initiated queries to identify one or more terms that map to at least one of the entities and to identify modifiers of the one or more terms;
   compiling a set of the modifiers that most frequently occur as a component within the plurality of user-initiated queries; and
   establishing the most-frequently-occurring set of modifiers as the task groups.

3. The one or more computer-readable media of claim 2, wherein the modifiers include prefixes that precede the one or more terms that are identified as mapping to at least one of the entities in the query class, or suffixes that follow the one or more terms, and wherein the modifiers correspond to one or more terms in the dictionary assigned to the query class.

4. The one or more computer-readable media of claim 3, the method further comprising:
   identifying the prefixes and the suffixes that are commonly employed to refine a search with a particular entity from the gallery of entities;
   associating the identified prefixes and suffixes with each other; and
   collapsing the list of terms in the dictionary by moving the associated prefixes and suffixes to a single entry.

5. The one or more computer-readable media of claim 1, wherein the process of identifying further comprises:
   accessing a related-searches list, wherein the related-searches list includes terms from the dictionary that are offered to users while conducting a search with an entity from the gallery of entities; and
   performing a session analysis utilizing the related-searches list, the session analysis comprising:
   (a) compiling historical reactions of the users when selecting one or more of the terms in the related-searches list;
   (b) identifying a set of the terms in the related-searches list that have most-frequently received a positive reaction from the users; and
   (c) establishing the identified set of terms as the task groups.

6. The one or more computer-readable media of claim 5, wherein selecting one or more of the terms in the related-searches list indicates that the users are attempting to narrow the search by incorporating the one or more terms from the dictionary into a query, and wherein the positive reaction from the users includes a click-through on a term from the related-searches list and a selection on a follow-on webpage rendered in response to the click-through.

7. The one or more computer-readable media of claim 6, wherein ranking the one or more terms based on predetermined parameters to produce an ordering comprises ranking the one or more of the terms in the related-searches list in accordance with a strength of the positive reaction from the users, wherein the selection on the webpage is weighted higher than the weight attached to the click-through.

8. The one or more computer-readable media of claim 1, the method further comprising filtering the task groups utilizing criteria, wherein the task groups that satisfy the criteria are persisted while the task groups that do not meet the criteria are disqualified.

9. The one or more computer-readable media of claim 8, wherein the criteria comprise at least one of the following: ascertaining that the task group does not include a timeframe component; or ascertaining that the task group includes as a component an entity from the gallery of entities aggregated to form the query class.

10. The one or more computer-readable media of claim 1, wherein, precedent to assigning the dictionary to the query class, the method further comprises generating the dictionary by extracting the list of terms from at least one of structured data feeds or a source external to a search engine.

11. The one or more computer-readable media of claim 1, wherein the method further comprises:
   identifying the task groups from the list of terms within the dictionary for each entity of the gallery of entities individually such that the task groups associated with a first entity of the gallery of entities vary from the task groups associated with a second entity of the gallery of entities; and
   ranking the task groups associated with each entity individually based on the predetermined parameters.

12. The one or more computer-readable media of claim 1, wherein the method further comprises:
   recognizing that an entity in the gallery of entities lacks sufficient user search behavior to derive the popular user search intents at a high level of accuracy; and
   applying the task groups established for another entity in the gallery of entities to the recognized entity.

* * * * *